United States Patent [19]
Seki et al.

[11] Patent Number: 5,844,496
[45] Date of Patent: Dec. 1, 1998

[54] SIGNAL GENERATION METHOD AND STRUCTURE FOR A TRANSMISSION AND RECEPTION SYSTEM

[75] Inventors: Noboru Seki; Ichirou Nakahara, both of Furukawa, Japan

[73] Assignee: Alps Electric Co., Ltd., Japan

[21] Appl. No.: 718,671

[22] Filed: Sep. 23, 1996

Related U.S. Application Data

[62] Division of Ser. No. 328,219, Oct. 25, 1994, Pat. No. 5,594,429.

[30] Foreign Application Priority Data

Oct. 27, 1993 [JP] Japan .................................. 5-292839

[51] Int. Cl.$^6$ ............................................. H04Q 1/00
[52] U.S. Cl. .............................. 340/825.31; 340/825.52
[58] Field of Search ......................... 340/825.31, 825.34, 340/825.3, 825.53, 825.52

[56] References Cited

U.S. PATENT DOCUMENTS

| | | | |
|---|---|---|---|
| 3,069,657 | 12/1962 | Green | 340/825.53 |
| 4,100,533 | 7/1978 | Napolitano | 340/825.53 |
| 4,761,808 | 8/1988 | Howard | 340/825.52 |
| 4,970,504 | 11/1990 | Chen | 340/825.31 |
| 5,103,221 | 4/1992 | Memmola | 340/825.31 |
| 5,239,294 | 8/1993 | Flanders | 340/825.31 |
| 5,572,193 | 11/1996 | Flanders | 340/825.31 |

*Primary Examiner*—Brian Zimmerman
*Attorney, Agent, or Firm*—Brinks Hofer Gilson & Lione

[57] ABSTRACT

A transmission and reception system including a transmitter for transmitting a signal including identification (security) information and function information, and a receiver for receiving and decoding the signal and for executing the operation defined by the function information upon verification of the identification information. The transmitter divides one or more of the identification information and the function information into two or more bit groups, and transmits these bit groups such that identification information bit groups are separated by function information and function information bit groups are separated by identification information. In one embodiment, the intermixed function and identification bit groups are transmitted without a time gap, and in another embodiment the function bit groups and the identification bit groups are arranged in groups containing one or more function information bit groups and one or more identification information bit groups, these groups then being transmitted with a time gap therebetween. The receiver includes information necessary for recombining the identification information and the function information for performing verification of the identification information and execution of the operation defined by the function information. In a further embodiment the identification information includes both fixed and variable codes, the variable code being changed after each transmission.

13 Claims, 9 Drawing Sheets

SIGNAL GENERATION METHOD AND STRUCTURE FOR A TRANSMISSION AND RECEPTION SYSTEM

This application is a division of application Ser. No. 08/328,219, filed Oct. 25, 1994 now U.S. Pat. No. 5,594,429.

FIELD OF THE INVENTION

The present invention relates to a transmission and reception system to be used for remote-control of, for example, locking/unlocking of car doors, and more particularly, to a signal generation method for generating transmitted information including data sequences of identification information and data sequences of command information so that the information cannot be easily deciphered.

BACKGROUND OF THE INVENTION

Conventionally, transmission and reception systems for the remote-controlled locking/unlocking of car doors, turning ON/OFF of head lights, unlocking of trunks and the like have been proposed. In this type of system, a small transmitter is carried by a car owner and used to transmit a signal which includes an identification code and a function code, and a receiver is mounted in a car for receiving and decoding the identification code portion of the transmitted signal and for performing various operations defined by the function code.

Figure 15:
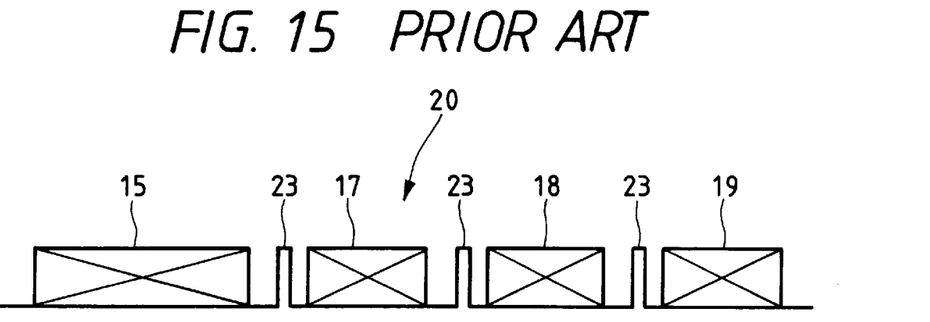
FIG. 15 is an explanatory diagram describing code contents of a transmitted-signal from a transmitter.
Figure 16:
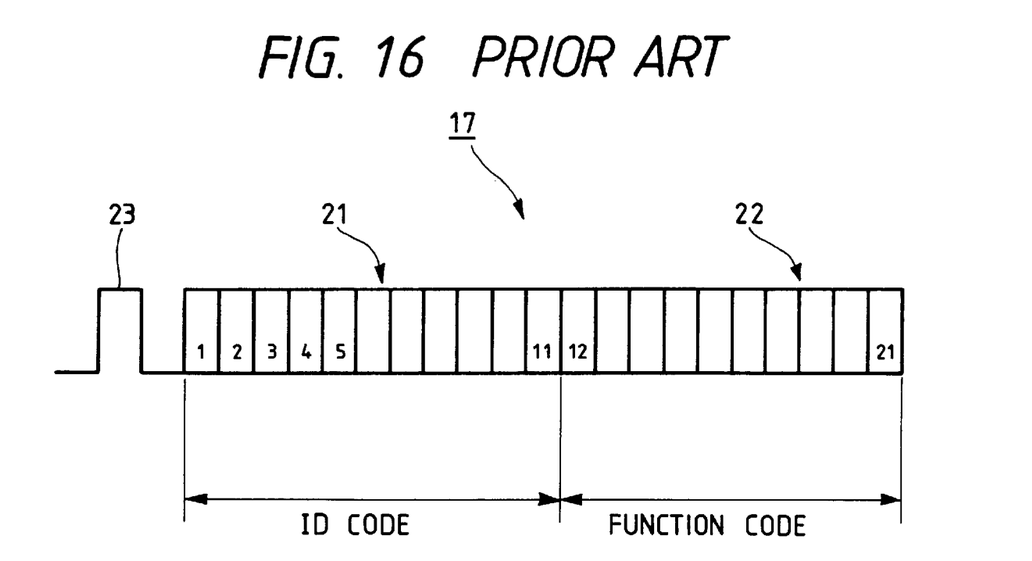
FIG. 16 is an explanatory diagram showing structure of conventional a transmitted-signal group.

An example of a signal transmitted from the transmitter is shown in FIGS. 15 and 16.

The transmission signal 20 shown in FIG. 15 is typically generated by a micro-computer and associated circuitry located in the transmitter. The transmission signal 20 includes an initializing pulse 15 for initializing a signal reception process of the receiver, and subsequent transmitted-signal groups 17, 18, and 19. The transmitted-signal groups 17, 18, and 19 usually contain identical (or inverse) patterns of high and low ("1" and "0") signals. As shown in FIG. 15, data transmission pulses 23, 23, and 23 are provided before each of the transmitted-signal groups 17, 18, and 19 so the subsequent transmitted-signal groups 17, 18, and 19 can be identified.

FIG. 16 shows a data structure exemplifying the transmitted-signal group 17.

The transmitted-signal group 17 includes, in this example, twenty-one bits of data, wherein the first eleven data bits constitute an identification (ID) code 21 representing identification (security) information, and the residual ten data bits constitute a function code 22 representing command information. The ID code 21 is a series of data bits ("1"s and "0"s) which are arbitrarily established for each transmitter/receiver pair such that the transmitted ID code 21 is, for all practical purposes, only accepted by an associated receiver. Once the receiver has accepted a transmitted ID code 21, the receiver then executes an operation designated by the data bits of the function code 22, such as locking/unlocking of doors, unlocking of a trunk and the like. Unlike the ID code 21, the function code 22 is typically not unique for each transmitter/receiver set.

A problem with prior art transmission and reception systems is that when the transmitted-signal groups 17, 18, and 19 include the data structure shown in FIG. 16, this data arrangement can be easily analyzed and decoded by someone who obtains knowledge that the first eleven data bits constitute the ID code 21, and the residual ten data bits

2 constitute the function code 22. For example, if an outsider (such as a thief) intercepts and analyses the transmission signal of at least two transmitters, he or she can distinguish the ID code 21 from the function code 22, and can thereby produce unauthorized devices for disarming similar security systems.

An object of the present invention is to address the conventional issues described above by providing a signal generation method for a transmission and reception system which cannot be easily deciphered, thereby making it difficult to distinguish identification information from command information within a transmitted-signal group.

SUMMARY OF THE INVENTION

The present invention is directed to a remote transmission and reception system in which a transmission signal is modified to prevent interception of the signal for unauthorized purposes.

The transmission signal used in the system includes a plurality of transmitted-signal groups. Each transmitted-signal group includes identification (security) information and function (command) information, both of which being defined by a plurality of data bits. The plurality of transmitted-signal groups include an identical or inverted arrangement of the data bits ("1"s and "0"s), and each transmitted-signal group is preceded by a short delay period which may include a pulse signal. A transmitter transmits the transmission signal which is received by a corresponding receiver. The receiver confirms authorized access by comparing the identification information of the transmitted-signal groups with stored information, and then facilitates operations based on the function information.

In accordance with one aspect of the present invention, a signal generation method includes dividing the identification and function information into bit groups, and these bit groups then being arranged to form a transmitted-signal group in which a function bit group is placed between each pair of identification bit groups. The transmission signal is then transmitted to the receiver which includes information regarding the bit groups such that the receiver can separate the transmitted-signal group into the identification information and the function information. The receiver then verifies the identification information and performs the operations defined by the function information. By mixing the identification information and function information before transmission, the signal generation method in accordance with the present invention makes unauthorized decoding of the transmission signal difficult because without knowledge of the number of bits in each bit group, it is very difficult to distinguish identification information from function information.

In accordance with another aspect of the present invention, the bit groups making up a transmitted-signal group are separated by short transmission delays. This further complicates unauthorized decoding by making it difficult to distinguish between the short delay period preceding each transmitted-signal group and the short transmission delays within each transmitted-signal group.

In accordance with another aspect of the present invention, the identification information includes both a fixed (unchanging) code and a variable code. The variable code is determined by timer circuits, random number generators or arithmetic circuits which are provided in both the transmitter and the receiver. A signal generation method according to this aspect of the invention includes recalculating the variable code stored in the transmitter each time the transmission signal is transmitted by the transmitter, and recalculating the variable code stored in the receiver each time a transmission signal is received from the receiver. To prevent rejection of a variable code by the receiver when the variable code values stored in the transmitter and receiver are out of synchronization, a correction code may be transmitted by the transmitter upon, for example, each door locking operation, or a plurality of sequential variable codes may be stored such that any one of several sequential variable codes are accepted by the receiver. By including a variable code along with the fixed code in the identification information, the unauthorized decoding of a transmission signal becomes nearly impossible because without knowing the function from which the variable code is calculated, an unauthorized copy of a transmission signal is rendered essentially useless.

BRIEF DESCRIPTION OF THE DRAWINGS

FIG. 13 shows a case that a variable code is shifted by a grade under a predetermined rule.

DESCRIPTION OF THE PREFERRED EMBODIMENT

Figure 1:
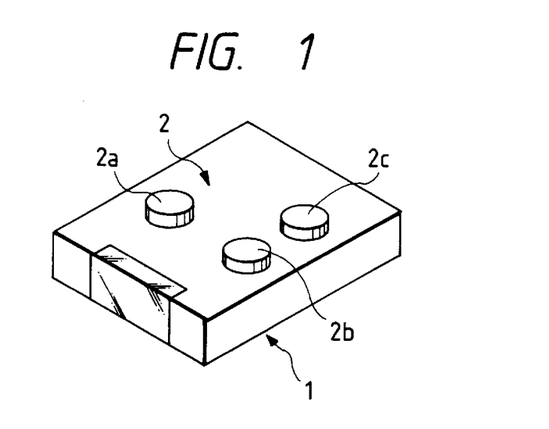
FIG. 1 is an external perspective view of a transmitter.
Figure 2:
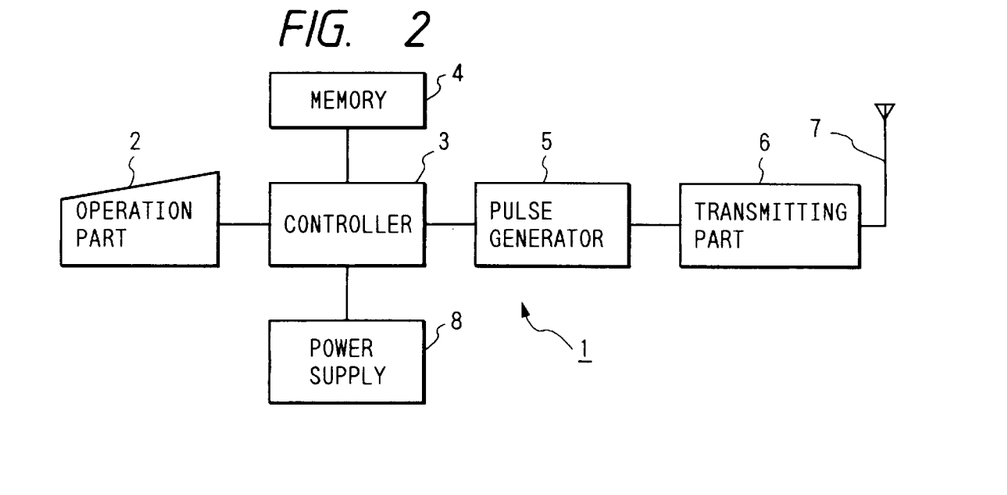
FIG. 2 is a block diagram showing circuit structure of the transmitter shown in FIG. 1.
Figure 3:
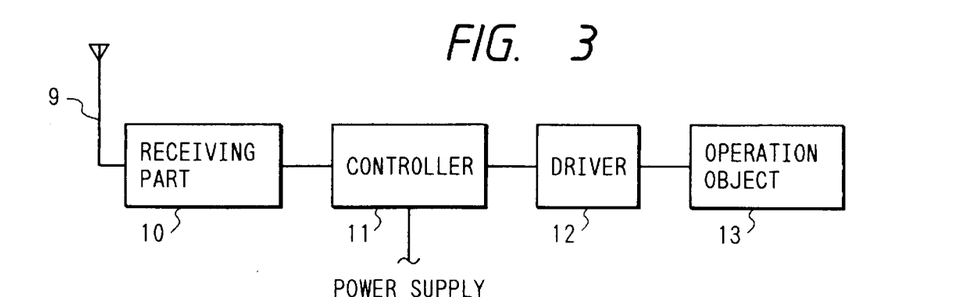
FIG. 3 is a block diagram showing circuit structure of a receiving side of a system.

A transmitter and receiver system according to the present invention will be described with reference to FIGS. 1–8 in which FIG. 1 is an external perspective view of a transmitter, FIG. 2 is a block diagram showing circuit structure of the transmitter shown in FIG. 1, FIG. 3 is a block diagram showing circuit structure of a receiving side of a system, and FIG. 4 to FIG. 8 are explanatory diagrams showing examples of a transmitted-signal group generation.

The transmitter and receiver system according to the present invention includes a transmitter 1 and a receiver. A key holder-size transmitter 1 is shown in FIG. 1 which is suitable for portable use. An operation part 2 is provided on a surface of the transmitter 1, as shown in FIG. 1. The operation part 2 includes a plurality of operation buttons 2a to 2c which are manually depressed by a user, and which determine command information transmitted to the receiver.

As shown in FIG. 2, the transmitter 1 includes a controller 3 typically composed of a CPU (Central Processing Unit), the operation part 2 which includes the operation buttons 2a to 2c, a memory 4 comprising a ROM (Read Only Memory) for storing an initializing signal and identification information, a pulse generator 5 for generating pulses corresponding to the initializing signal, operation command information and identification information stored in the memory 4, a transmitting part 6 for transmitting pulses generated at the pulse generator 5 after FM or AM modulation, an antenna 7 and a power supply 8.

As shown in FIG. 3, a receiver of the system, which is typically mounted in a car, comprises an antenna 9 for receiving the signal from the transmitter 1, a receiving part 10 for demodulating the signal, a controller 11, typically composed of a CPU (Central Processing Unit), and a driver 12 for driving an operation object 13 such as a door locking mechanism and the like, based on a driving signal generated by the controller 11.

In operation, when an instruction is entered via the operation buttons 2a to 2c, the controller 9 retrieves the necessary identification information and command information from the memory 4, and controls the pulse generator 5 to generate a transmission signal. The transmission signal generated by the transmitter 1 is similar to the prior art transmission signal 20 shown in FIG. 15. That is, the controller 9 instructs the pulse generator to produce pulses representing a transmission signal including an initialization signal 15 sequentially followed by data transmission pulse 23, a first transmitted-signal group 17, a second data transmission pulse 23, a second transmitted-signal group 18, a third data transmission pulse 23 and, finally, a third transmitted-signal group 19. Each of transmitted-signal groups 17, 18, and 19 contains the same data or may have inverse contents (each "1" is transmitted as a "0" and each "0" is transmitted as a "1"). A transmission signal generated in this manner is transmitted after modulation by the transmitting part 6.

The transmission signal generated in accordance with the present invention differs from the prior art in that at least one of the identification information and the command information is divided into two or more data sequences (bit groups), as the other of the identification information and the command information is inserted between the two or more data sequences.

In accordance with a first embodiment, each of the transmitted-signal groups 17, 18 and 19 are formed such that there are no pauses (time gaps) between each of the data sequences. This feature will become clear in the following examples.

A first example of the contents of a transmitted-signal group 17 in accordance with the first embodiment of the present invention will be described with reference to FIG. 4. As shown, the contents of the transmitted-signal group 17 include an eleven-bit identification information (ID) code 21 and a ten-bit function code 22. Similar to the prior art transmitted group shown in FIG. 16, the ID code 21 contains security information, and the function code 22 contains operation command information.

Figure 4:
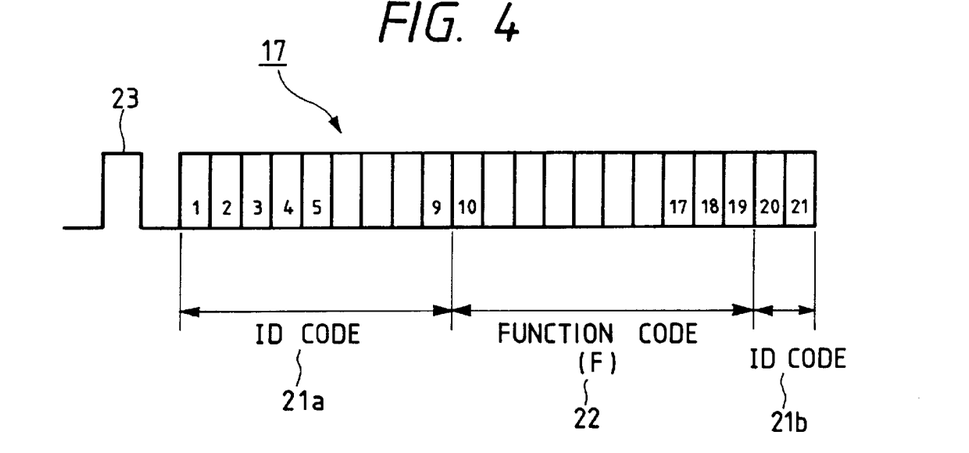
FIG. 4 is a explanatory diagram showing an example of basic structure of a transmitted-signal group.

In the first example shown in FIG. 4, the ID code 21 is divided into a nine-bit data sequence (bit group) 21a and a two-bit data sequence 21b by the controller 3, and the function code 22 is inserted between the data sequence 21a and data sequence 21b. The intermixed ID and function code signals are then passed to the pulse generator 5, which causes the transmission part 6 to generate transmission signals in which the transmitted-signal groups 17, 18 and 19 are transmitted without a time gap between the intermixed ID and function code information. Further, the controller 11 of the receiver includes information regarding the arrangement of the ID code and function code information and separates the ID code 21 from the function code 22 before processing the transmission signal.

Figure 5:
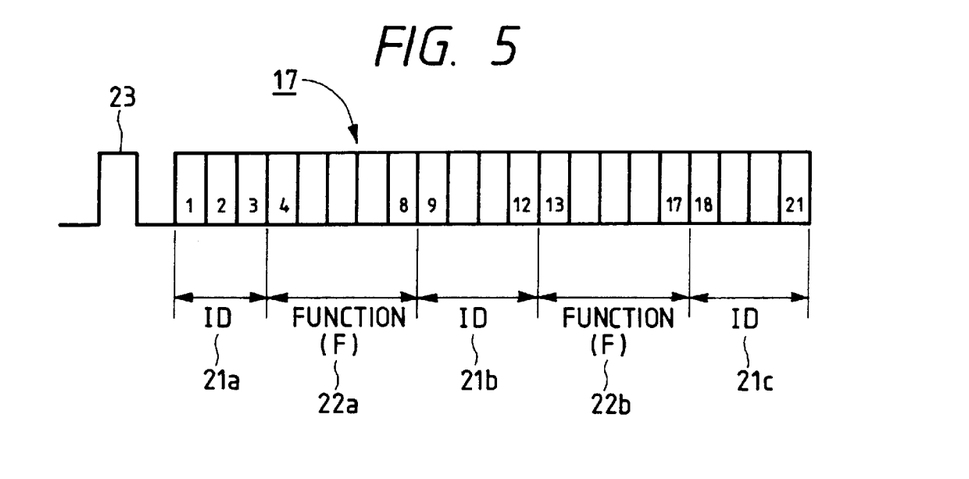
FIG. 5 is an explanatory diagram showing another example of structure of a transmitted-signal group.

A second example of the first embodiment is shown in FIG. 5. In the second example, the transmitted-signal group 17 includes an ID code 21 which is divided into three data sequences 21a, 21b, and 21c, and a function code 22 which is divided into two data sequences 22a and 22b. Each of the data sequences of the function code 22 are located between two of the data sequences of the ID code 21 within each transmitted-signal group 17, 18 and 19 without a time gap.

Figure 6:
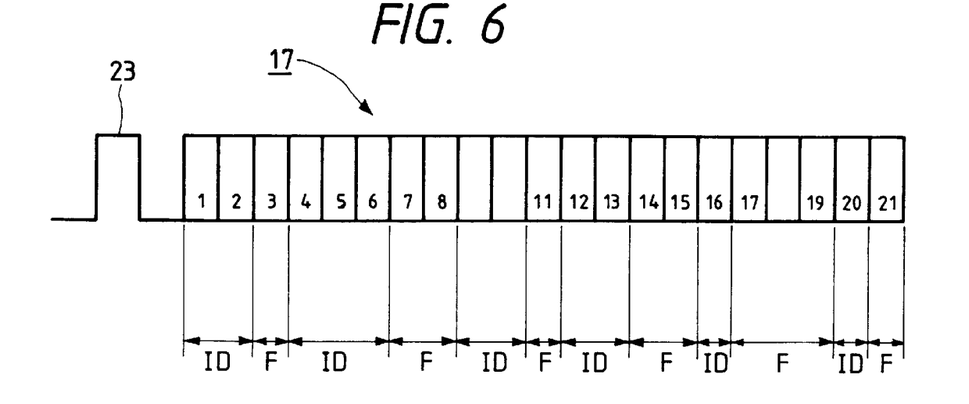
FIG. 6 is an explanatory diagram showing still another example of structure of a transmitted-signal group.

A third example of the first embodiment is shown in FIG. 6. In the third embodiment, both the ID code 21 and the function code 22 are divided into an equal number of data sequences, and the sequences are combined alternately in pairs.

A method for generating a transmitted-signal group 17 in accordance with the first embodiment (as shown in FIGS. 4 to 6), along with transmitted-signal groups 18 and 19 having identical or inverse contents, includes storing in memory 4 information corresponding to one or more dividing points at which the ID code and the function code are divided by the controller 3. Portions of the ID code and the function code are read from the memory 4 and divided by the controller 3 in accordance with the dividing point information, and these portions are then sent to a pulse generator 5 and aligned by the pulse generator 5 as consecutive pulses.

Figure 9:
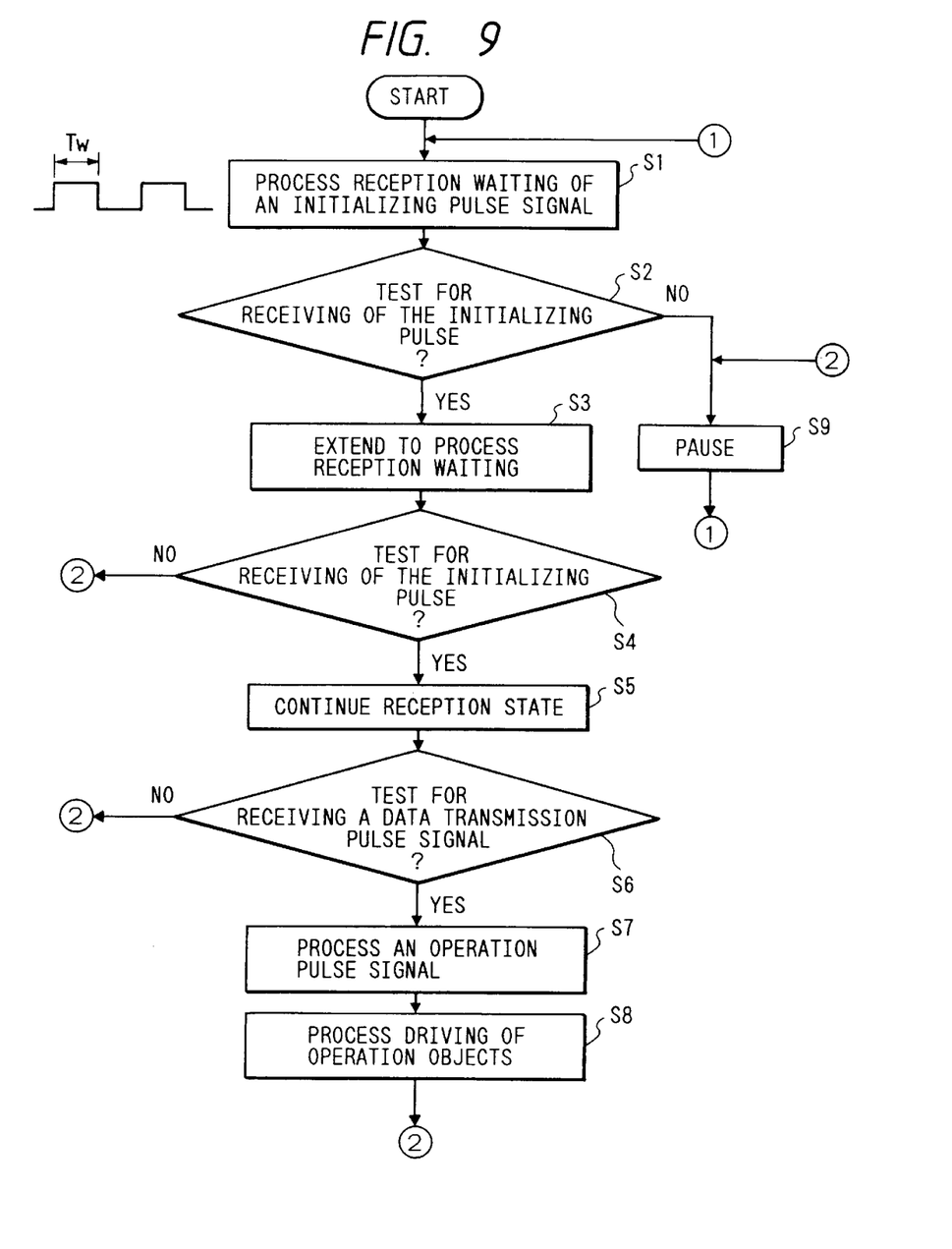
FIG. 9 is a flow chart describing operation in a receiving side of a system.

FIG. 9 shows a flowchart indicating a method for processing transmission signals including any of transmitted-signal groups of the first embodiment (shown in FIGS. 4 to 6).

Step 1 (shown as S1; subsequent steps are shown similarly): before an initializing pulse signal 15 (shown in FIG. 15) is received, the receiver of a system is in a waiting state in which it checks for this initializing pulse signal 15 intermittently every predetermined time period. That is, the receiving part 10 enters a receptive state intermittently every time period $T_w$ during which the initializing pulse signal 15 will be accepted.

Step 2: when the receiving part is in the receptive state, processing advances to step 3 if the initializing pulse signal 15 is received. Alternatively, if the initializing pulse signal 15 is not received within time period $T_w$, the processing advances to the step 9, stops the receiving operation for a predetermined period, and then returns to the step 1.

Step 3: if the initializing pulse signal 15 is received within time period $T_w$, the processing prolongs the time period $T_w$, thereby creating an extended receptive state, and then advances to the step 4.

Step 4: when the receiver is in the extended receptive state, the processing advances to the step 5 if the initializing pulse signal 15 is continuously received. If the initializing pulse signal 15 is paused when the time period $T_w$ is in extended receptive state, the processing advances to the step 9.

Step 5: during this step the receiver is in a continuously receptive state, and hence, the process awaits a subsequent reception of a data transmission pulse 23.

Step 6: The process advances to the step 7 if the data transmission pulse 23 is received, or the process advances to the step 9 if the data transmission pulse 23 is not received within a predetermined time period.

Step 7: if the data transmission pulse 23 is received, the process then determines that subsequently received data is a transmitted-signal group 17, 18 or 19, and deciphers the transmitted-signal group 17, 18 or 19. More particularly, the received data signal is demodulated by the receiving part 10 and processed by the controller 11. The controller 11 performs determination and deciphering during this time. During the processing operation by the controller 11, the received signals are divided into data sequences associated with the ID code 21 and the function code 22. Then, the controller collects the ID code 21 portions and the function code 22 portions inside the transmitted-signal group 17, 18 or 19 respectively, and restores their order. Next, the controller determines whether the received ID code 21 coincides with the identification information stored in the receiver and, if they coincide with each other, the controller deciphers the command contents of the function code 22.

Step 8: the controller commands a driver 12 to drive each operation object corresponding to the command contents of the function code 22 deciphered during step 7.

In the transmitted-signal groups shown in FIGS. 4 to 6, since the ID code and the function code are aligned in pieces, deciphering becomes very difficult because distinguishing the identification information from the function code cannot be done easily if an outsider tries to decipher this data after intercepting the transmitted-signal groups 17, 18 and 19.

Figure 7:
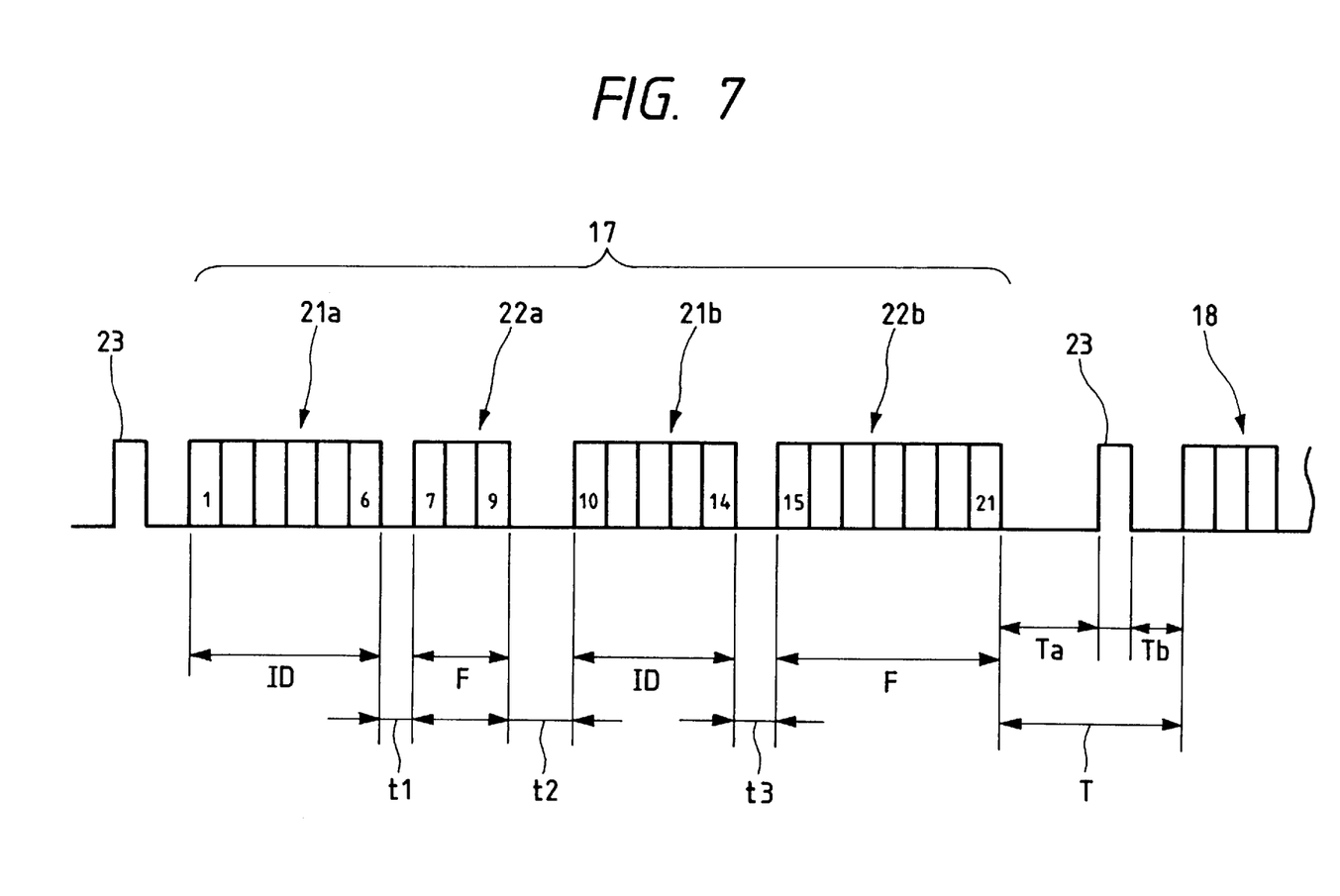
FIG. 7 is an explanatory diagram showing an example of structure of a transmitted-signal group with a non-data time.

FIG. 7 shows data contents of transmitted-signal groups 17, 18 and 19 according to a second embodiment of the present invention.

In the second embodiment shown in FIG. 7, identification information (ID code) is divided into data sequences 21a and 21b, a function code is also divided into data sequences 22a and 22b, the data sequences 21a and 21b and data sequences 22a and 22b are aligned alternately. In addition, non-data (pause) time periods having time periods t1, t2 and t3 are provided between the divided parts of data sequences 21a, 22a, 21b, and 22b, respectively.

Moreover, a data transmission pulse 23 is inserted respectively between transmitted-signal groups 17 and 18 and between transmitted-signal groups 18 and 19, the data transmission pulses being separated from the transmitted-signal groups by cutout (pause) times Ta and Tb. Therefore, when the entire transmission signal from the initializing pulse signal 15 to the final transmitted-signal group 19 are considered together, it is apparent that non-data times t1, t2, and t3 and the cutout times Ta and Tb are dispersed at many points. Thus, it is difficult for an outsider to distinguish the non-data time at a divided part of a data sequence from the cutout time between transmitted-signal groups. Hence, the transmission signal is difficult to decipher.

However, it is necessary for the receiver to distinguish between the non-data times t1, t2, and t3 and the cutout times Ta and Tb. This is accomplished, for example, by making a length of the non-data times t1, t2, and t3 less than a predetermined value and making a length of the cutout times Ta and Tb more than the predetermined value, thereby allowing identification at the receiving side of the system to be easily performed.

Similarly, if a data transmission pulse 23 is not used, identification by the receiving side of the system can be easily performed by making a length of the non-data time t1, t2, and t3 less than a predetermined value and making a length of the cutout time T between the transmitted-signal groups 17, 18, and 19 more than the predetermined value.

Figure 8:
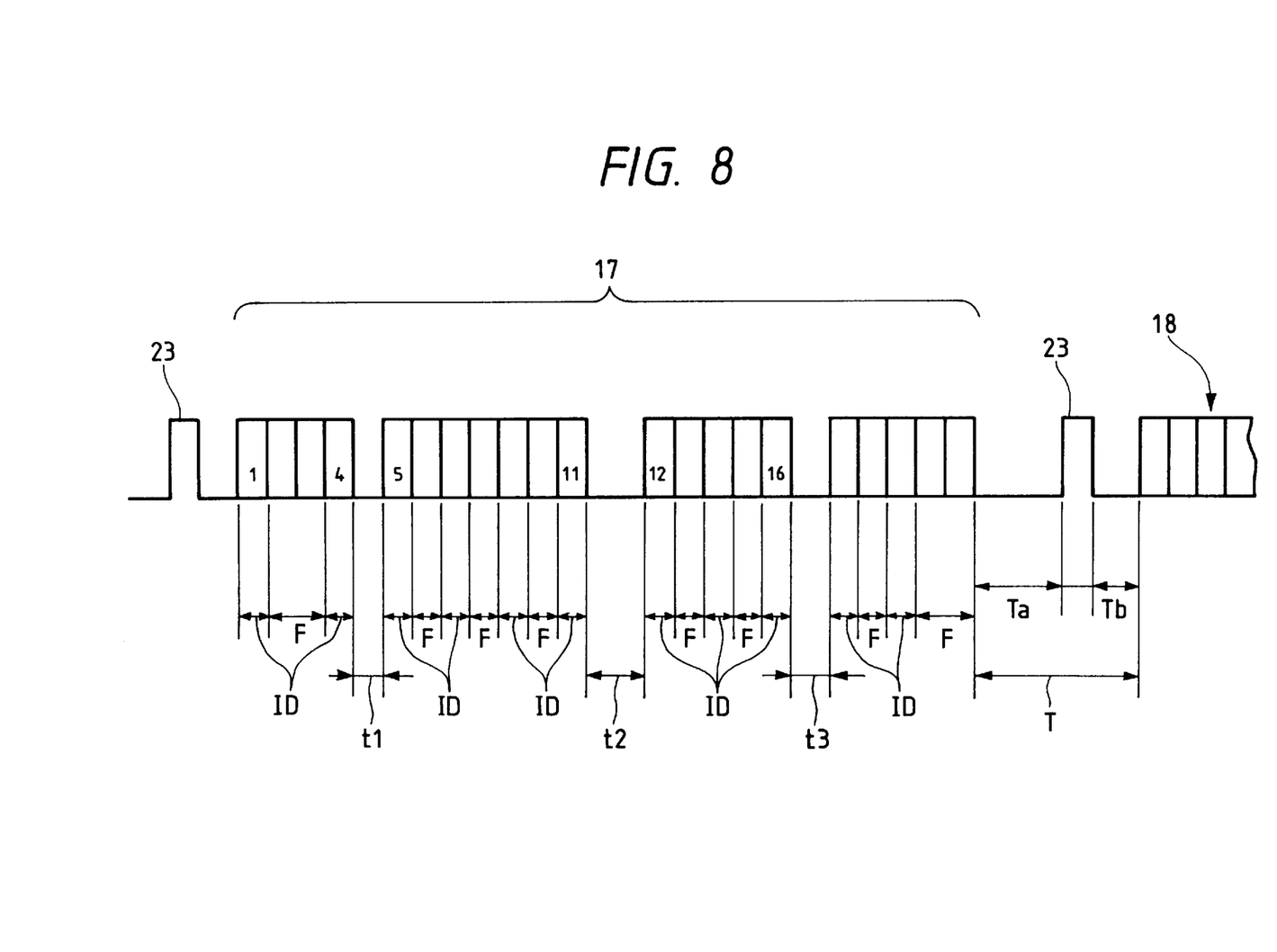
FIG. 8 is an explanatory diagram showing another example of structure of a transmitted-signal group with a non-data time.

Moreover, in a second example of the second embodiment which is shown in FIG. 8, within a transmitted-signal group 17, the ID code and the function code are divided into portions, and the portions are combined into groups containing a varying number of ID code portions separated by function code portions. Furthermore, the non-data times t1, t2, and t3 can be provided between these groups independently of the division.

Next, a third embodiment according to the present invention will be described.

Figure 10:
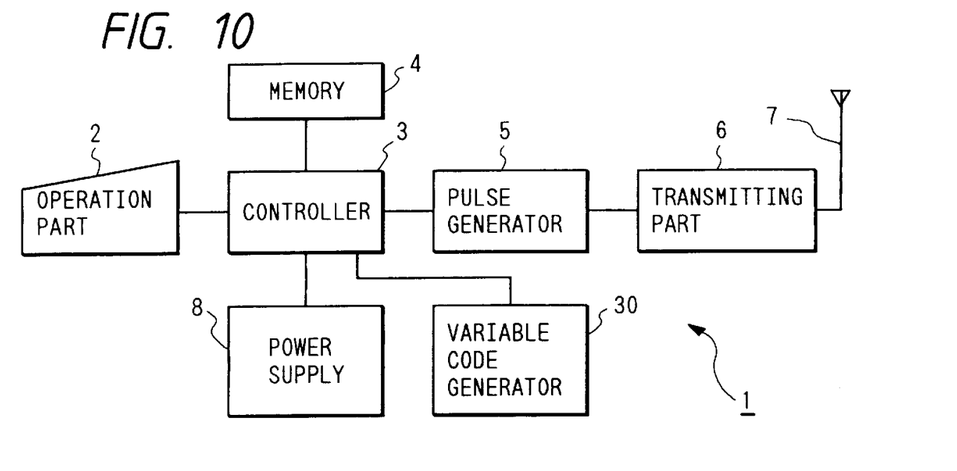
FIG. 10 is a block diagram showing circuit structure of a receiver.
Figure 11:
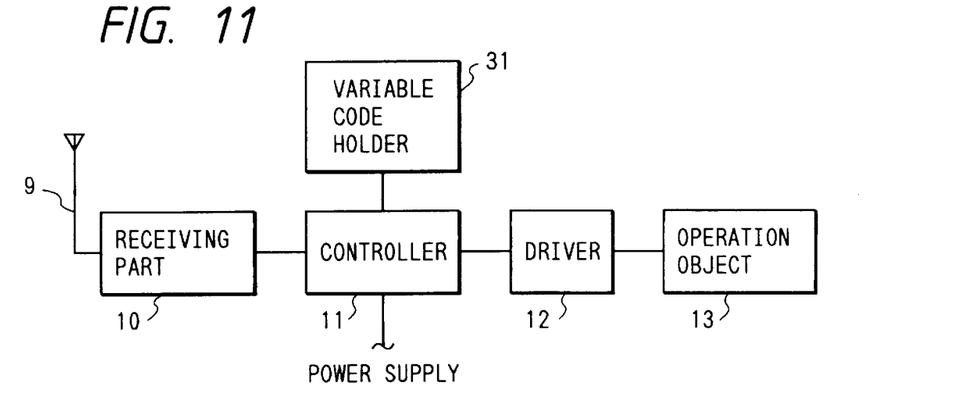
FIG. 11 is a block diagram showing circuit structure of a receiving side of a system.
Figure 12:
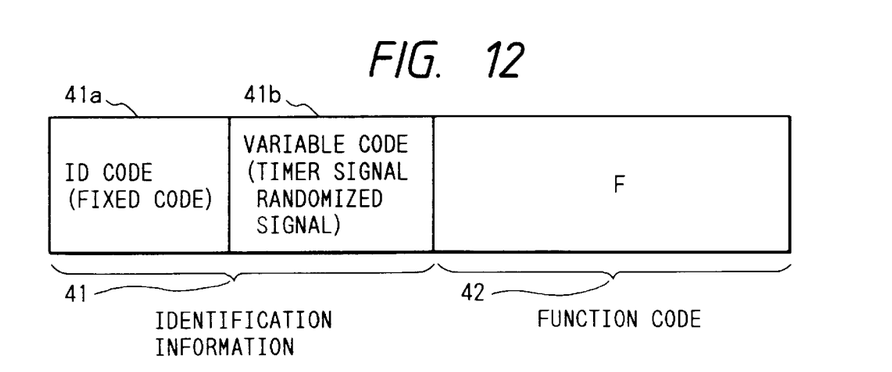
FIG. 12 is an explanatory diagram showing an example of structure of a transmitted-signal from the transmitter shown in FIG. 10.

FIG. 10 is a block diagram showing circuit structure of a transmitter, FIG. 11 is a block diagram showing circuit structure of a receiver, and FIG. 12 is an explanatory diagram showing an example of a signal transmitted between the transmitter and the receiver. Similar portions of the circuit structures described above are identified with the same reference numerals in the third embodiment, and a detailed description of these portions will be omitted.

The transmitter shown in FIG. 10 has a variable code generator 30 connected to a controller 3, and the receiver shown in FIG. 11 has a variable code holder 31 connected to a controller 11.

The variable code generator 30 includes, for example, a timer circuit, a random number generator for calculating an optional number at random, or an arithmetic circuit for changing a number according to a predetermined rule.

First, an example in which the variable code generator 30 includes a timer circuit will be described. Note that a timer circuit is also necessary in the variable code holder 31 of the receiver of the system. For example, if similar timer circuits are provided in both the transmitting side and receiving side of the system, a variable code corresponding to time stamp information by the timer circuit may be generated through an arithmetic operation at the variable code generator 30 or controller 3 in the transmitting side of the system.

In the transmitter, as shown in FIG. 12, after a fixed code (ID code) 41a from a memory 4 and a variable code 41b from the variable code generator 30 are read, identification information 41 is generated; furthermore, a function code (command information) 42 corresponding to operation follows this identification information, and these are then transmitted from the transmitting part 6.

In the receiver, when a signal shown in FIG. 12 is received, coincidence of the fixed code 41a is determined by the controller 11, and coincidence of the variable code based on the timer circuit provided by the variable code holder 31 are confirmed. If the coincidence of the fixed code 41a and variable code 41b is confirmed, a function code 42 is accepted. However, if either of the fixed code 41a and the variable code 41b do not coincide, recognition of the function code is rejected.

In addition, in some instances in which a variable code 41b is generated by timer circuits built into a variable code generator 30 and coincidence is determined by a variable code holder 31, differences between time stamping operation of the timer of the circuit 30 and that of the circuit 31 sometimes arise. Thus, when predetermined command information (function code) is issued, correction information is added to the variable code 41b. Addition of this correction information is limited to, for example, issued timing of a door locking command. When this door locking command (function code 42) is transmitted, correction information is transmitted at the same time, and coincidence of the ID code 41a is confirmed first by the receiver when this correction information is received, the correction information then being accepted when the ID code 41a is confirmed, and finally the time stamping operation of the timer circuit of the variable code holder 31 in the receiver is corrected.

In this manner, since timer correction is performed every door locking command which is operated whenever a system user leaves a car, non-coincidence of a variable code which is generated with the use of timers located in the transmitter and the receiver of a system becomes rare. In addition, when a command operation other than door locking is performed, deciphering of a stolen signal's contents is impossible since different identification information 41 corresponding to its time stamping is transmitted. Furthermore, even if an outsider deciphers stolen signal contents, burglary of a car can be prevented because this signal can perform only a door locking operation.

Examples in which a random number is used as a variable code 41b will now be described.

In a first example, a circuit generating a random number is provided only in a variable code generator 30 located in a transmitter. Only when a predetermined operation, for example, door locking operation is performed, a new random number is outputted from the variable code generator 30, and this is stored by the variable code holder 31 in the receiver.

When an operation besides door locking is performed, a random number obtained from the variable code generator 30 is calculated by the controller as predetermined in the transmitter, a variable code 41b is generated, and transmitted. In the receiver, when coincidence of a fixed code (ID code) 41a is confirmed, the variable code 41b is inversely calculated by a controller 11, this is compared to the random number stored in the variable code holder 31, and a function code 42 is accepted only when this coincidence occurs.

As described above, a random number used for this calculation is updated every door locking operation. Thus, only when door locking operation is performed, a new random number or a signal based on a new random number is generated as command information, and a variable held at the variable code holder 31 is updated in the receiving side of the system.

Therefore, because the random number is updated every door locking operation, it becomes difficult to steal and decipher a signal. In addition, in case an operation signal is copied and an outsider tries to steal a car with this deciphered signal, and if a user performs the door locking operation once, the outsider cannot again operate with the copied signal because the used variable code is updated.

In addition, the transmitter and receiver can be made to shift a variable code 41b under a predetermined rule every transmission. An example of this case will be described hereafter.

In this example, in a transmitter shown in FIG. 10, a program executing a predetermined expression is stored in the variable code generator 30 or in the controller 3, and a variable code 41b can be shifted by a predetermined amount in accordance with this expression. Moreover, in a receiver shown in FIG. 11, a program executing the same expression as performed by the transmitter is stored in the variable code holder 31 or the controller 11, the variable code being shifted by the same predetermined amount, and the shifted variable code being stored in the variable code holder 31. This expression can be expressed by f(x) as a function of x. The variable x is an integer shifting by a predetermined amount in the order of 1, 2, 3, and so on. The function f(x) can be a quadratic function, cubic function or geometric series and so on. Conversely, the expression can be a random number changing in accordance with shifting of x by a predetermined amount.

Figure 13A:
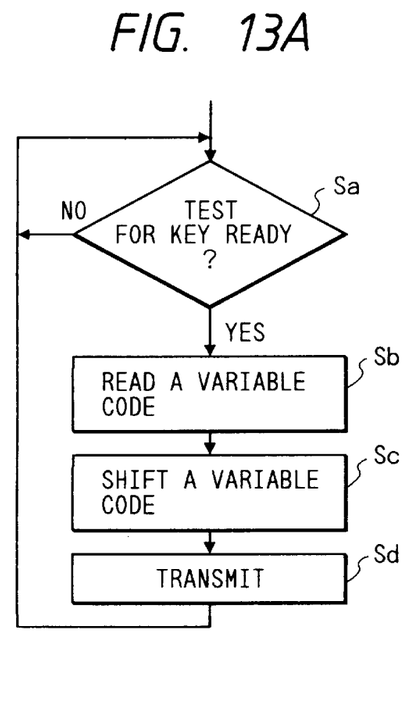
FIG. 13A is a flowchart of transmitting operation.

In a transmitter, as shown in the flow chart of FIG. 13A, when a key operation for data transmission is performed (step a; shown as Sa (subsequent steps are shown similarly)), the previously transmitted variable code 41b is read at a variable code generator 30 or a controller 3 (Sb). It is assumed that the variable code in this instance is f(a), where x=a. Then, contents of this variable code is shifted by a grade, and a code f(a+1) is generated where x=a+1 (Sc). This code 41b defined by f(a+1) is arranged after a fixed code 41a read from the memory 4. Furthermore, a function code 42 is arranged after code 41b, and then transmitted-signal groups 17, 18, and 19 are generated and transmitted (Sd) using codes 41a, 41b and 42.

The controller 11 of the receiver associated with the system then checks for coincidence of the fixed code 41a and, upon confirmation, the variable code stored in the variable code holder 31 is compared with the received variable code. In the transmitter of the system, the x of the variable code f(x) is shifted by one grade every completion of a signal transmission, and if a previously received-signal was f(a), this is shifted to f(a+1). At the controller 11, the received variable code f(a+1) is compared with f(a+1) calculated at the receiving side of the system, and their coincidence is confirmed.

However, in the transmitter, for example, it is assumed that an operation button is unintentionally actuated once in an area where the transmission signal cannot reach the receiver. Subsequently, if the operation button is pressed near the receiver, the contents of a variable code 41b transmitted from the transmitter is out of synchronization with the previous normal transmission to f(a+2). On the other hand, in the receiver, since the code f(a+1) shifted by a predetermined amount from the previously received code f(a) is stored, the received variable code does not coincide with the code stored in the receiving side of the system.

Then, in this embodiment, a plurality of continual variable codes are stored by the variable code holder 31 in the receiving side of the system. It is assumed that the number of these stored codes is (n+1) (n is integer). For example, at some time, a plurality of codes from f(a) to f(a+n) are stored in the receiver. If a variable code f(a) is transmitted from the transmitting side of the system, coincidence of a received variable code with the plurality of codes is confirmed, and when the received variable code coincides with any of the plurality of codes, it is determined as normal reception. When transmission and reception of the f(a) is completed, a variable code is shifted by one to f(a+1) in the transmitter, all of a plurality of codes are made to shift by one in the receiving side of the system, and (n+1) variable codes from f(a+1) to f(a+n+1) are stored by the variable code holder 31. In this manner, if an ineffective or unintentional actuation as above described arises in the transmitting side of the system, normal operation of the receiver can be attained by the operations after the unintentional actuation through holding a plurality of continual codes in the receiver.

Figure 13B:
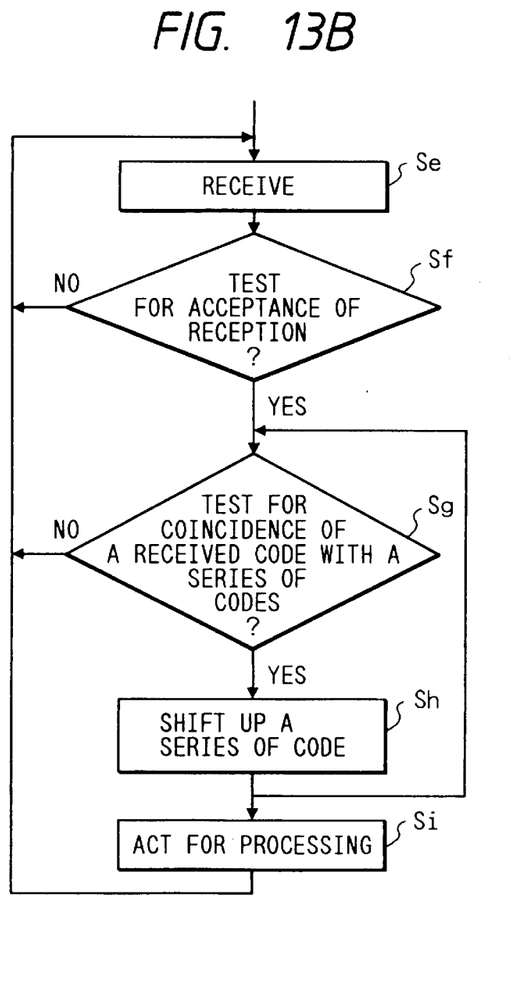
FIG. 13B is a flowchart of receiving operation.

Operation of a receiving side of a system will be described hereafter, referring to a flowchart in FIG. 13B.

When a signal from the transmitter is received (step Se), a controller determines whether the signal is acceptable or not, by testing whether a data transmission pulse 23 is received and so forth (Sf). Subsequently, the controller confirms not only coincidence of a function code 41a but also coincidence of a received variable code with any of the (n+1) held variable codes (Sg). If they coincide with each other, the controller causes the (n+1) variable codes to increment by one (Sh). Then, the process performs the operation such as door locking and the like (Si).

Referring to FIG. 14, the shifting operation of a variable code in a transmitting side of a system and plural variable codes in a receiving side of a system will now be described.

Figure 14A:
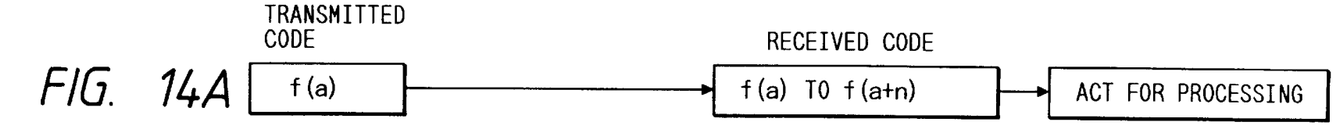
FIGS. 14A to 14F are explanatory diagrams describing code contents when a variable code is shifted in a transmitting side of a system and a plural of variable codes are shifted.
Figure 14B:
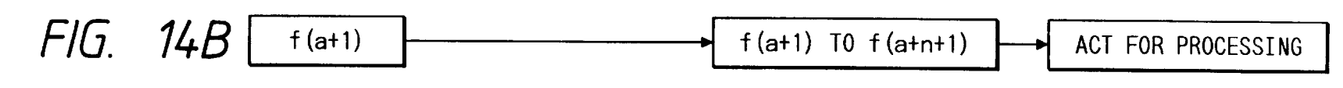
Figure 14C:
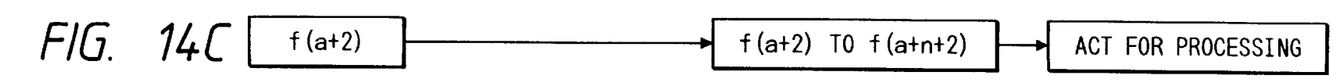

In FIG. 14A, a variable code f(a) is transmitted from a transmitter, and if a variable code stored by the receiving side of the system is in the range of f(a) to f(a+n), the variable codes coincide, and hence, processing operation is performed. As shown in FIG. 14B, if subsequent transmission is done, a transmitted variable code is shifted by a grade to f(a+1), and then, the codes coincide since the variable code in the receiving side of the system is shifted to f(a+1) to f(a+n+1), and hence, processing operation is performed. In a similar way, as shown in FIG. 14C, when f(a+2) is transmitted, the codes also coincide at this time since the variable code in the receiving side of the system is shifted to f(a+2) to f(a+n+2), and hence, processing operation is performed.

Figure 14D:
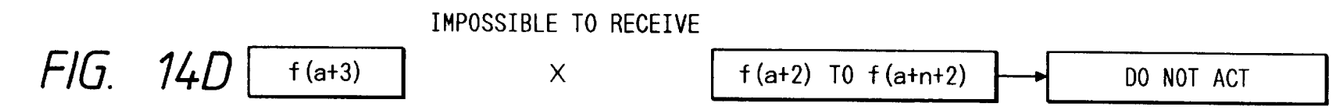
Figure 14E:
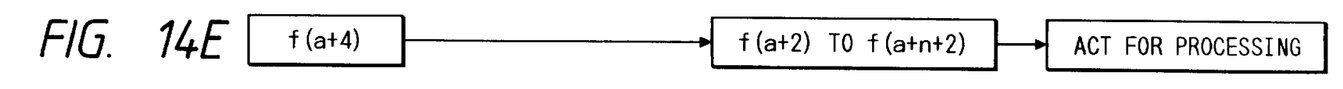
Figure 14F:
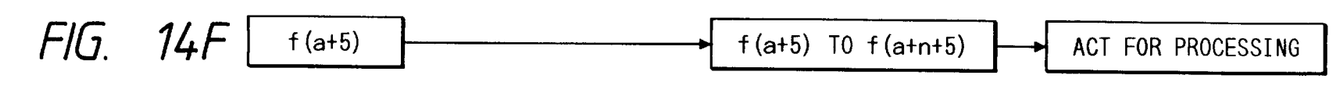

However, as shown in FIG. 14D, it is assumed that, when a variable code f(a+3) is transmitted from the transmitter, this transmission cannot be accepted because this transmission is not received by the receiver. In this case, variable codes in the receiving side of the system are still f(a+2) to f(a+n+2), and they are not shifted. Then, as shown in FIG. 14E, a transmitted variable code is shifted by one to f(a+4) in the subsequent transmitting operation. In this time, since the transmitted variable code coincides with any of the variable codes f(a+2) to f(a+n+2), it is determined to be normal reception and processing operation is performed. Further, if this receiving operation is performed, the controller makes the variable codes in the receiving side of the system shift each by a predetermined amount based on the variable code f(a+4), and makes the variable codes held in a receiver f(a+5) to f(a+n+5). Therefore, as shown in FIG. 14F, the next transmission can be accepted.

Since, by using the above variable code, the variable code is based on a predetermined rule such as f(x) and moreover this shifts by a predetermined amount every reception, it is impossible to identify and imitate the variable code from the transmission signal. Furthermore, since a plurality of successive variable codes are stored in the receiving side of the system, normal reception can be attained after an unreceived signal transmission if the transmission arises in the transmitting side of the system.

In each of the above-described embodiments, examples are provided in association with a remote-controlled device performing an operation such as door locking of a car and the like as an operation object. However, it is understood that the operation object is not limited to a car, and the embodiments can be applicable to the operation of other vehicles, the opening/closing of garage doors, the operation of doors and environmental settings of storehouses and the like. That is, each embodiment can be used in transmission and reception systems other than remote controlled devices for cars.

According to the present invention, since identification information and command information are divided and mixed together, an outsider cannot distinguish information if the outsider tries to decipher a code, and hence, deciphering becomes very difficult.

Moreover, by providing non-data pauses inside a transmitted-signal group, deciphering becomes more difficult since distinction between the non-data time and cutout time for repeating a transmitted-signal group cannot be determined.

Furthermore, by adding a variable code which changes every transmission operation to the above-described embodiments, distinction of information cannot be done, and deciphering can be made very difficult.

In addition, as shown in the above described embodiment, if a correction signal is generated and transmitted whenever command information associated with a predetermined operation, such as door locking, is transmitted, it is possible to prevent noncoincidence of the transmitted variable code and the variable code information stored in the receiver.

According to the present invention, since a variable code is based on a predetermined rule and moreover this shifts by a predetermined amount every transmission, it is impossible to identify and imitate the variable code from a transmitted-signal. Furthermore, since a plurality of successive variable codes shifted by the predetermined amount are stored in the receiving side of the system, normal reception is assured by the transmission operation after an unreceived transmission has occurred.

We claim:

1. A signal generation method for a system including a transmitter and a receiver in which a transmission signal is transmitted from the transmitter to the receiver, the transmission signal including a transmitted-signal group comprising identification information and command information, the identification information including a first plurality of bits and the command information including a second plurality of bits, the transmission signal being received, decoded and processed by the receiver, the signal generation method comprising the steps of:

dividing the first plurality of bits and the second plurality of bits into a plurality of bit groups;

transmitting a first one of the plurality of bit groups; and transmitting a second one of the plurality of bit groups a first predetermined time period after the transmission of the first one of the plurality of bit groups.

2. A signal generation method according to claim 1 wherein the transmission signal comprises first and second transmitted-signal groups, the first and second transmitted-signal groups including one of identical bit patterns and inverted bit patterns, wherein the method further comprises the steps of:

transmitting the first transmitted-signal group; and transmitting the second transmitted-signal group a second predetermined time period after the transmission of the first transmitted-signal group;

wherein a duration of the first predetermined time period is different from a duration of the second predetermined time period.

3. A signal generation method according to claim 1 wherein the transmission signal comprises first and second transmitted-signal groups, the first and second transmitted-signal groups including one of identical bit patterns and inverted bit patterns, wherein the method further comprises the steps of:

transmitting the first transmitted-signal group;

transmitting a pulse signal a second predetermined time period after the transmission of the first transmitted-signal group; and transmitting the second transmitted-signal group a third predetermined time after the transmission of the pulse signal;

wherein a duration of the first predetermined time period is different from durations of the second and third predetermined time periods.

4. The method according to claim 1, wherein each one of the plurality of bit groups comprises bits from only the first plurality of bits or only the second plurality of bits.

5. The method according to claim 1, wherein each of the plurality of bit groups comprises bits from both the first and second plurality of bits.

6. The method according to claim 1, further comprising the step of transmitting a third one of the plurality of bit groups a second predetermined time period after the transmission of the second one of the plurality of bit groups, wherein the first and second predetermined time periods are different.

7. A transmission and reception system comprising:

a transmitter for transmitting a transmission signal, the transmission signal including a transmitted-signal group comprising identification information and command information, the identification information including a first plurality of bits and the command information including a second plurality of bits, the transmitter including:

means for dividing the first plurality of bits and the second plurality of bits into a plurality of bit groups;

means for rearranging the plurality of bit groups to form a transmitted-signal group; and means for transmitting the transmitted-signal group, wherein a first one of the plurality of bit groups is transmitted, and after a first predetermined time, a second one of the plurality of bit groups is transmitted; and a receiver for receiving the transmission signal, the receiver including:

means for separating the transmission signal into the identification information and the command information;

means for comparing the identification information with stored data; and means for performing an operation defined by the command data if the identification information corresponds with the stored data.

8. The system according to claim 7, wherein each one of the plurality of bit groups comprises bits from only the first plurality of bits or only the second plurality of bits.

9. The system according to claim 7, wherein each of the plurality of bit groups comprises bits from both the first and second plurality of bits.

10. The system according to claim 7, wherein the means for transmitting the transmitted-signal group further comprises transmitting a third one of the plurality of bit groups after a second predetermined time period after transmission of the second one of the plurality of bit groups, wherein the first and second predetermined time periods are different.

11. The system according to claim 7, wherein the transmission signal comprises a second transmitted-signal group, and wherein the transmitter further comprises means for transmitting the transmitted-signal group; and transmitting the second transmitted-signal group a second predetermined time period after the transmission of the first transmitted-signal group; wherein the first and second predetermined time periods are different.

12. The system according to claim 11, wherein the transmitter further comprises means for transmitting a pulse signal between the transmission of the first and second transmitted-signal groups.

13. A signal generation method for a system including a transmitter and a receiver in which a transmission signal is transmitted from the transmitter to the receiver, the transmission signal including a transmitted-signal group comprising identification information and command information, the identification information including a first plurality of bits and the command information including a second plurality of bits, the transmission signal being received, decoded and processed by the receiver, the signal generation method comprising the steps of:

dividing one of the first plurality of bits and the second plurality of bits into a plurality of bit groups;

transmitting a first one of the plurality of bit groups;

transmitting at least a portion of the other of the first plurality of bits and the second plurality of bits after the transmission of the first one of the plurality of bit groups; and transmitting a second one of the plurality of bit groups after the transmission of the portion of the other of the first plurality of bits and the second plurality of bits, wherein the step of transmitting at least a portion of the other of the first plurality of bits and the second plurality of bits or the step of transmitting a second one of the plurality of bit groups is delayed a predetermined time period after the previous transmitting step.

* * * * *